United States Patent Office 3,476,535
Patented Nov. 4, 1969

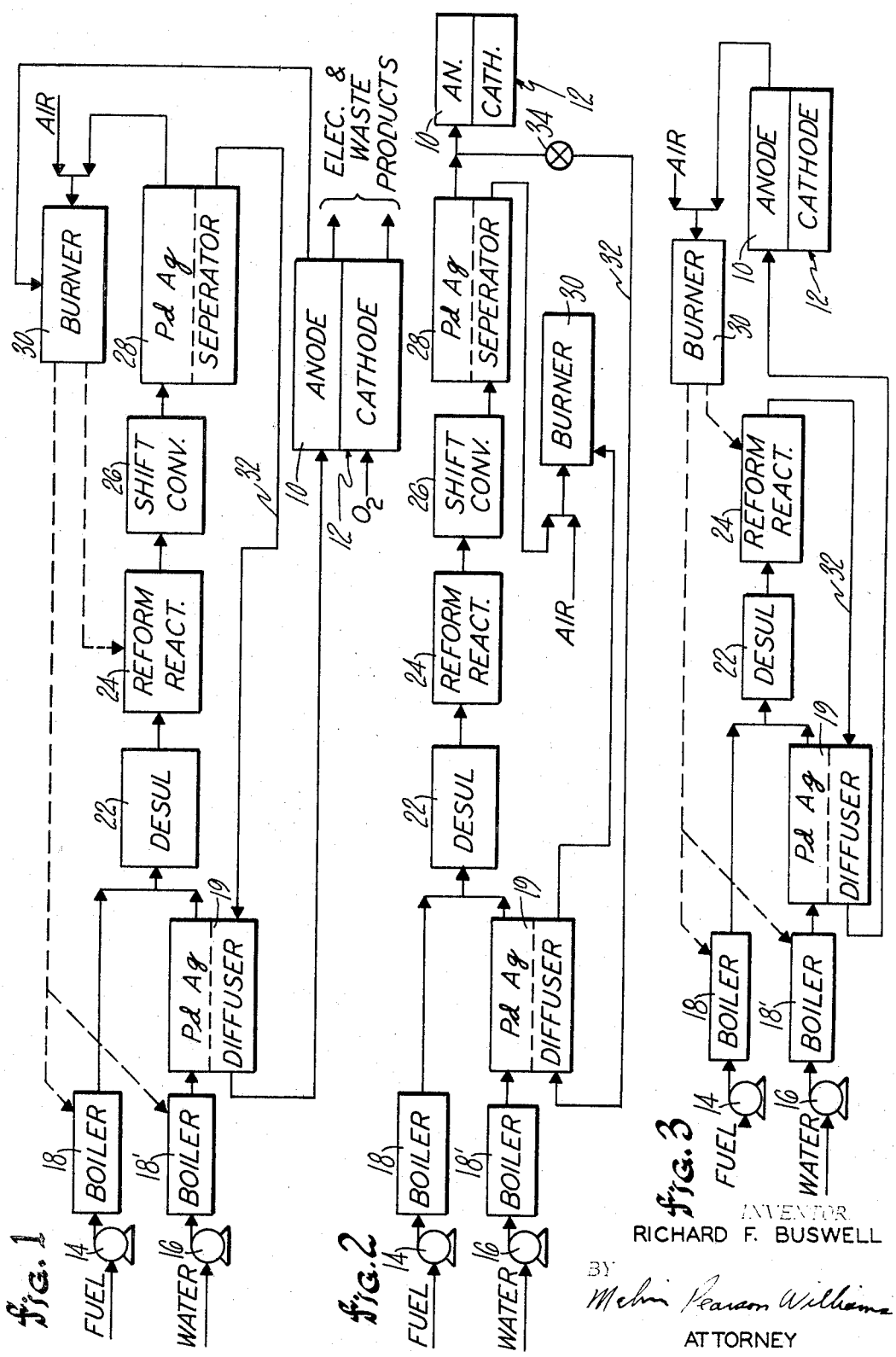

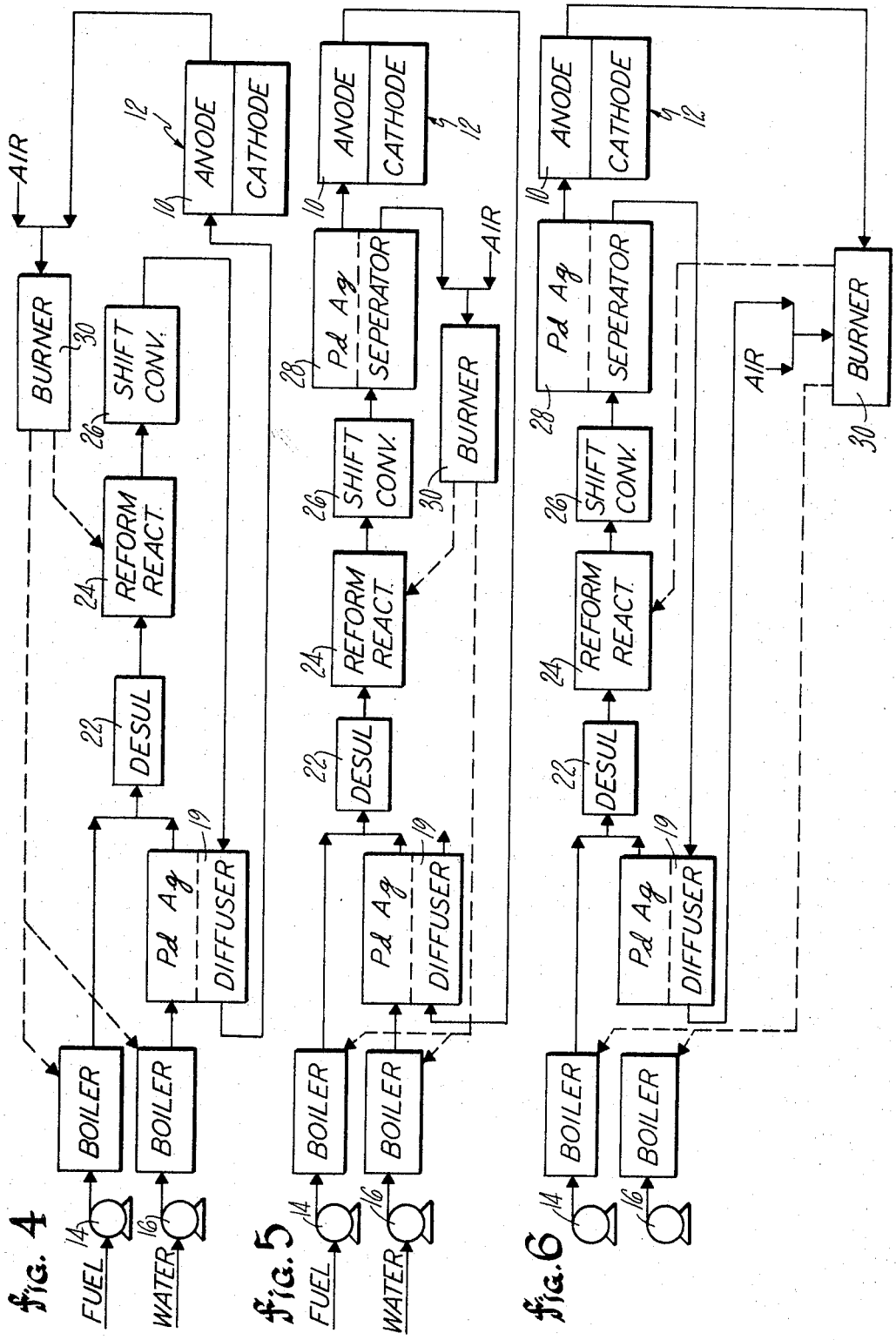

3,476,535
HYDROGEN GENERATOR INCLUDING DESULFURIZATION WITH DIFFUSED HYDROGEN FEEDBACK
Richard F. Buswell, Glastonbury, Conn., assignor to United Aircraft Corporation, East Hartford, Conn., a corporation of Delaware
Filed Sept. 26, 1967, Ser. No. 670,642
Int. Cl. C10g 23/00
U.S. Cl. 48—94    5 Claims

ABSTRACT OF THE DISCLOSURE

A hydrogen generator utilizing steam and hydrocarbon fuel as the reactants and including a desulfurization device and a hydrogen feedback system. Hydrogen is recycled and fed to the steam stream by means of a diffusion device. The hydrogen is fed back serially or in parallel from any point downstream of a steam reforming reactor.

CROSS-REFERENCE TO RELATED APPLICATIONS

Desulfurizing means useful in conjunction with the present invention is disclosed and claimed in a copending application of the same assignee, entitled Sulfur Removal from Hydrocarbons, filed on even date herewith by H. J. Setzer and R. W. Whiting, Ser. No. 670,636.

Details of a hydrocarbon generator of which the present invention may be comprised are disclosed in an application of the same assignee, entitled Method and Apparatus for Generating Hydrogen from Liquid Hydrogen Containing Feedstock, filed Aug. 3, 1965, by R. F. Buswell et al., Ser. No. 476,906.

BACKGROUND OF THE INVENTION

Field of invention

This invention relates to desulfurization of hydrocarbon fuels for a hydrogen generator, and more particularly to a feedback system capable of utilizing hydrogen at low pressure for the enrichment of hydrocarbon fuel as an assist in the desulfurization process.

Description of the prior art

Fuel cell powerplants are known to include two separate main sections. One is the fuel cell proper, which reacts oxygen (or air) with hydrogen so as to form electricity together with waste hydrogen and air byproducts as well as heat and water. The other portion of the fuel cell powerplant system is the hydrogen generator, which is sometimes referred to as a reformer. The hydrogen generator portion of a fuel cell powerplant reacts a combination of hydrocarbon fuel and water to generate hydrogen gas for use in a fuel cell reactor. In the prior art, such systems utilize sulfur-free hydrocarbon fuels. However, the usefulness of fuel cells is mitigated due to the need for special refining of the hydrocarbon fuel so as to achieve a low sulfur content prior to use in a fuel cell powerplant system. In order for the efficiencies of a fuel cell to reach maximum value, many applications of fuel cells would be enhanced by the ability of the fuel cell to use commercially available hydrocarbon fuels such as jet engine fuel, unleaded gasolines, natural gas, etc., as a source of hydrocarbons for hydrogen generation.

SUMMARY OF THE INVENTION

An object of the invention is provision of hydrogen feedback for desulfurization of hydrocarbon fuel in a hydrogen generator, utilizing low pressure hydrogen without the need for a hydrogen pump.

According to the present invention, water and hydrocarbon fuel are boiled separately, and hydrogen generated in the hydrogen generator is diffused into the steam so as to enhance the desulfurization of the hydrocarbon/steam admixture. In accordance with another aspect of the present invention, the low pressure hydrogen is diffused into the water, rather than into the fuel, to avoid sulfur poisoning of the diffuser as a result of sulfur in the raw hydrocarbon fuel.

The foregoing and other objects, features and advantages of the present invention will become more apparent in the light of the following detailed description of the preferred embodiments thereof as illustrated in the accompanying drawing.

BRIEF DESCRIPTION OF THE DRAWING

FIG. 1 is a schematic block diagram of a first embodiment of a hydrogen generator in accordance with the present invention, in which the hydrogen output of a palladium-silver separator is fed through a diffuser prior to utilization;

FIG. 2 is a schematic block diagram of a second embodiment of the present invention in which a portion of the hydrogen output of the hydrogen generator is fed to a diffuser, any remaining hydrogen at the output of the diffuser being used to operate a burner;

FIG. 3 is a schematic block diagram of an additional illustrative embodiment of the present invention in which hydrogen from a steam reforming reactor is fed through a diffuser prior to passing through a shift converter in the hydrogen generation process; and FIG. 4 is a schematic block diagram of still another illustrative embodiment of the present invention in which the hydrogen output of a shift converter is fed through the diffuser prior to the utilization thereof;

FIG. 5 is a schematic block diagram of another embodiment of the present invention in which effluent from the anode of a fuel cell is fed to the diffuser; and FIG. 6 is a schematic block diagram of still another embodiment of the present invention in which bleed gas from a palladium-silver separator is fed to the diffuser.

DESCRIPTION OF THE PREFERRED EMBODIMENT

The present invention is particularly concerned with the ability to utilize low pressure hydrogen to enrich a hydrocarbon.

Referring now to FIG. 1, hydrocarbon fuel is fed to a pump 14 where fuel at substantially atmospheric pressure may be pumped up to anywhere from 150 to 300 pounds per square inch absolute (p.s.i.a.), the particular pressure being dependent upon details of the system not involved herewith. Another pump 16 is utilized to similarly pressurize water for admixture with the hydrocarbon fuel.

In the embodiment of FIG. 1, fuel and water are each pumped to a high pressure by corresponding pumps 14, 16 and passed through respective boilers 18, 18' to provide superheated vapors of steam and various hydrocarbons. The steam is fed through a palladium-silver diffuser 19. The palladium-silver diffuser 19 is the same type of apparatus as a palladium-silver separator. It operates on the principle that hydrogen will diffuse through the palladium-silver membrane from the side thereof at which hydrogen has a higher partial pressure to the side at which hydrogen is at a lower partial pressure. Since there is essentially no uncombined hydrogen in the superheated steam being supplied to the palladium-silver diffuser by the boiler, hydrogen will readily diffuse into the steam through the palladium-silver membrane. Choice of a proper effective area of palladium-silver membrane will cause a proper amount of hydrogen to diffuse into the steam. This amount is not critical since there is a broad range of amounts of hydrogen which may be fed back into the steam so as to provide sufficient hydrogen to assist in the desulfurization process, without unduly burdening the system with excess hydrogen circulating through the feedback line. The choice of amount of hydrogen to be fed back, and therefore the choice of the particular detailed design of the palladium-silver diffuser 19, depends upon the particular system being designed, and is within the skill of the art. An important aspect of the present invention is that the hydrogen is diffused into the water, rather than into the hydrocarbon fuel; this allows use of hydrocarbon fuels having a very high sulfur content without poisoning of the palladium-silver diffuser.

The outputs of the boiler 18 and the separator 19 are admixed at the input to a desulfurizer 22, which may comprise a combination catalyst and absorbent of any suitable type, but most preferably would be of the type described in a copending application of the same assignee entitled Sulfur Removal from Hydrocarbons filed on even date herewith by H. J. Setzer and R. W. Whiting, Ser. No. 670,636. From the desulfurizer 22, the feedstock is fed to a steam reforming reactor 24, which is sometimes referred to as a dehydrogenation reactor. The output of the steam reforming reactor 24 is fed to a shift converter 26 which in turn feeds a palladium-silver separator 28. The palladium-silver separator 28 provides nearly pure hydrogen to the anode 10 of the fuel cell 12, and also provides bleed gas, comprising a mixture of hydrogen, carbon monoxide, carbon dioxide, methane and water, to a burner 30 which combines the bleed gas with air so as to generate heat, the heat being applied to operate the steam reforming reactor 24 and the boilers 18, 18'. The boilers 18, 18', the steam reforming reactor 24, the shift converter 26, the palladium-silver separator 28, the burner 30 may all be of the type described in a copending application of the same assignee entitled "Method and Apparatus for Generating Hydrogen from Liquid Hydrogen Containing Feedstock," filed on Aug. 3, 1965 by Richard F. Buswell et al., Ser. No. 476,906. Briefly described, the process in the steam reforming reactor 24 involves converting any of a number of different types of hydrocarbons which are in the feedstock by combining with steam so as to form hydrogen, carbon dioxide, carbon monoxide, and methane, along with some uncombined steam and traces of unconverted hydrocarbons of various types. Then the shift converter 26 in turn combines a high percentage of the carbon monoxide in the output of the steam reforming reactor 24 with unreacted steam so as to form further hydrogen and carbon dioxide. Thus, the output of this shift converter includes a mixture of nearly all of the hydrogen which was available in the feedstock, some steam, together with carbon monoxide, carbon dioxide and methane. There are also traces of various hydrocarbons which have not been recombined. Thus, hydrogen is converted not only from the hydrocarbon fuel, but also from the water which is combined therewith to form the feedstock. This is described in great detail in the aforementioned copending Buswell et al. application.

As is well known in the art of hydrodesulfurization, any desulfurizing catalyst/absorbent works better with a hydrogen rich feedstock. This is described more fully in the aforementioned copending application of H. J. Setzer and R. W. Whiting.

In accordance with the modifications of the present invention, the feedstock input to the steam reforming reactor 24 is passed through the desulfurizer 22. The mixture which enters the desulfurizer 22 includes superheated hydrocarbon fuel from the boiler 18 which is supplied thereto through a pump 14 together with superheated steam from a boiler 18' that is hydrogen enriched by passing through the palladium-silver diffuser 19 within which some portion of the hydrogen generated in the system is allowed to diffuse into the superheated steam. The boiler is supplied water through a pump 16.

As illustrated at the right-hand end of FIG. 1 the hydrogen product of the system is fed from the diffuser 19 to the anode 10 of the fuel cell 12. Oxygen, or air, may be fed to the cathode of the fuel cell, as is well known in the art. Not all of the hydrogen which is passed through the anode 10 is consumed, and the output effluent from the anode 10 may be transmitted over a line to a burner, the burner also receiving a mixture of air with bleed gas from the palladium-silver separator 28. The burner in turn supplies heat to operate the reforming reactor 24 and the boilers 18, 18'. Of course, the feeding of the burner, and the usage of fuel cell waste products may be arranged in any suitable fashion in accordance with the teachings of the art, and are not germane to the present invention.

The embodiment shown in FIG. 2 utilizes a parallel feedback rather than a serial feedback of the hydrogen generator product so as to enrich the water applied to the system. As shown in FIG. 2, a portion of the hydrogen product from the palladium-silver separator 28 is tapped off in a feedback line 32, the amount tapped off being controllable by a valve 34 or by choice of suitably sized piping. Any remaining hydrogen is fed from the palladium-silver diffuser 19 into the burner 30, which also receives a mixture of air and bleed gas from the palladium-silver separator 28. As described in respect to FIG. 1, the details of usage of the effluent from the separator 28, the diffuser 19 and from the fuel cell 12 itself are not germane to the present invention, and may be suitably disposed in accordance with any one of a number of arrangements known in the art. Heat connections from the burner 30 to the boiler 18, 18' and reforming reactor 24 are eliminated in FIG. 2 for clarity.

The embodiments of FIGS. 3 and 4 illustrate that the palladium-silver separator 28 need not be used in a system to take adavantage of the present invention. In the embodiment of FIG. 3, hydrogen from the reforming reactor 24 is passed through the palladium-silver diffuser 19 and then to the anode 10 of the fuel cell 12. In the embodiment of FIG. 4 hydrogen is passed from the output of the shift converter 26 through the palladium-silver diffuser 19 and then to the anode 10 of the fuel cell 12.

The embodiments of FIGS. 3 and 4 are serial in nature (similar to FIG. 1), but the invention also encompasses bleeding off a portion of the output of either the reforming reactor 24 or the shift converter 26 and passing that through the palladium-silver diffuser 19, with the effluent from the diffuser 19 being utilized in the burner 30 (similar to FIG. 2).

The embodiment of FIG. 5 illustrates that the effluent from the anode 10 of the fuel cell 12 may be fed to the diffuser 19 so as to supply hydrogen to the feedback for enhancement of the desulfurization process. The output of the diffuser may in turn be fed to the burner for increased efficiency.

In the embodiment of FIG. 6, the bleed gas from the separator 28 is fed first through the diffuser 19 and then to the burner. By adjustment of the ratios of pressures in the system, the entire supply of hydrogen will not be separated in the palladium-silver separator, and there will thus be hydrogen in the main flow as it passes to the palladium-silver diffuser. As an example, if the anode of the fuel cell is operated at around atmospheric pressure the anode feed side of the palladium-silver separator may be operating at about 30 p.s.i.a., whereas the main feed side of the membrane may be operating at 150 p.s.i.a. This ratio of 30 to 150 means that one fifth of the hydrogen that is available in the main flow of gases will never diffuse for use at the anode of the fuel cell. Thus, 20% of the hydrogen generated is available for feedback through the palladium-silver diffuser 19. Since there is no molecular hydrogen being supplied to the diffuser 19 from the boiler 18', most of this hydrogen will therefore diffuse into the steam line in the diffuser, leaving basically carbonaceous products (methane, carbon dioxide, and carbon monoxide) to be passed to the burner.

The diffuser 19 is preferably a palladium-silver membrane, but any form of hydrogen diffusion membrane may be used herein. The choice from among a variety of membranes known in the art is left to the skill of the artisan. Although the embodiments herein illustrate use of hydrogen in the anode of a fuel cell, it should be understood by those skilled in the art that the principle of the present invention, which relates to diffusion of feedback hydrogen for desulfurization of hydrocarbon feedstock is equally valuable without regard to the use to which the generated hydrogen is to be put.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of the invention, that which we claim as new and desire to secure by Letters Patent of the United States is:

1. A hydrogen generating system, comprising:
   a source of gaseous hydrocarbon fuel;
   a source of steam;
   diffusion means including a first chamber and a second chamber, said chambers being separated by a hydrogen diffusion membrane, said first chamber of said diffusion means having its input connected to said source of steam;
   desulfurizing means connected to the output of said first chamber of said diffusion means and to said source of gaseous hydrocarbon fuel, said desulfurizing means operative to remove significant amounts of sulfur from the feedstock mixture of steam and gaseous hydrocarbon fuel;
   a steam reforming reactor connected to and fed by output of said desulfurizing means; and
   means connected to a point downstream of said steam reforming reactor for conducting products including at least molecular hydrogen to the input of said second chamber of said diffusion means, whereby hydrogen is diffused into the steam as it passes through said first chamber.

2. The hydrogen generating system according to claim 1 further comprising:

hydrogen utilization apparatus; and
means connecting the output of said second chamber of said diffusion means to the input of said hydrogen utilization apparatus.

3. The hydrogen generating system according to claim 1 further comprising:
   a hydrogen utilization apparatus, the input of which is connected so as to receive the product of said steam reforming reactor downstream thereof and wherein effluent from said hydrogen utilization apparatus is connected to the input of said second chamber of said diffusion means.

4. The hydrogen generating system according to claim 1 including a hydrogen separation means having first and second chambers separated by a hydrogen diffusion membrane, the input of said first chamber of said separation means being connected downstream of said steam reforming reactor as to receive product therefrom, the output of said first chamber of said separation means being connected to the input of said second chamber of said diffusion means.

5. The hydrogen generating system according to claim 4 in which the output of said second chamber of said separation means is connected to a hydrogen utilization device.

References Cited

UNITED STATES PATENTS

| | | | |
|---|---|---|---|
| 2,773,561 | 12/1956 | Hunter | 23—210 XR |
| 2,902,440 | 9/1959 | Beuther et al. | |
| 3,019,096 | 1/1962 | Milbourne | 48—213 |
| 3,148,031 | 9/1964 | Vahldieck et al. | 23—210 |
| 3,178,272 | 4/1965 | Dent et al. | 48—213 |
| 3,278,268 | 10/1966 | Pfefferle | 23—212 |
| 3,350,176 | 10/1967 | Green et al. | 48—214 XR |
| 3,415,634 | 12/1968 | Dent et al. | 48—214 XR |

FOREIGN PATENTS

| | | |
|---|---|---|
| 992,161 | 5/1965 | Great Britain. |

MORRIS O. WOLK, Primary Examiner

B. S. RICHMAN, Assistant Examiner

U.S. Cl. X.R.

23—210, 212; 48—214; 208—209